United States Patent Office 3,830,920
Patented Aug. 20, 1974

3,830,920
BACTERICIDAL VETERINARY COMPOSITIONS
Alexander McKenzie Morrison, Bury, and Charles Leslie
Meredith Brown, Epsom, England, assignors to Wigglesworth Limited, Westhoughton, Bolton, England
No Drawing. Filed Oct. 26, 1971, Ser. No. 192,642
Claims priority, application Great Britain, Oct. 30, 1970,
51,809/70; July 14, 1971, 33,129/71
Int. Cl. A61k 27/00
U.S. Cl. 424—258
12 Claims

ABSTRACT OF THE DISCLOSURE

Veterinary compositions are described which have bactericidal and possibly also fungicidal and/or acaricidal properties. The compositions comprise a synergistic mixture of at least one of capryhydrocupreinotoxine HCl, benzalkonium chloride and bis-(2-hydroxy-5-chlorophenyl) sulphide, and a physiologically acceptable solvent such as 2,2-dimethyl-1,3-dioxolane-4-methanol which may have a synergistic effect. The compositions preferably additionally include an acylated protein hydrolysate which, besides being useful in giving the compositions an acid pH hostile to bacteria, is a powerful penetrating agent to assist in killing infections immediately below the skin and also promotes healing of damaged tissue. The compositions are very useful in the treatment of mastitis in cows where, besides being more powerful than penicillin, they do not contaminate milk or animal flesh and so build up penicillin-resistance in humans. Also they have been found to cure demodectic mange in dogs.

---

This invention relates to veterinary compositions which have bactericidal properties and which may additionally have fungicidal and/or acaricidal properties, and is particularly concerned with compositions which are intended for external use on an animal or for instillation into animal body cavities as opposed to use by parenteral administration.

BACKGROUND TO THE INVENTION

Cows udders, for example, are particularly susceptible to infection because of the presence of milk which is an excellent nutrient for bacteria. Therefore, it frequently becomes necessary to treat cows udders to kill infection.

When penicillin was first developed this was found to be excellent for this purpose and treatment with only a very small quantity of penicillin was found to cure infections rapidly. Gradually, however, strains of penicillin resistant bacteria have evolved with the result that increasing doses of penicillin have been required to kill the bacteria.

The situation has been reached where even large doses of penicillin will often only cause the bacteria to assume a latent state and as soon as the dosage of penicillin is stopped, the infection will flare-up again. Such infections cost farmers a considerable amount of money each year in loss of milk production and death of the cows.

Another disadvantage of using large amounts of penicillin on cows is that the residues of penicillin and/or its breakdown products find their way into milk. Over the years in spite of precautions contaminated milk has been drunk by humans who in turn have bred within them penicillin resistant bacteria. Therefore, the effectiveness of penicillin in the treatment of humans has been very substantially curtailed.

The replacement of penicillin with other antibiotics will only give similar disadvantageous results.

It is therefore necessary to provide a veterinary composition having bactericidal properties which will effectively kill bacteria without at the same time permitting contamination of milk or animal flesh with compounds which might have deleterious effects upon human beings from the point of view of toxicity or by encouraging development of resistant organisms, and it is an object of this invention to provide such a veterinary composition.

THE INVENTION

According to the invention there is provided a veterinary composition having bactericidal properties comprising a synergistic mixture containing the bactericidal agent caprylhydrocupreinotoxine HCl, benzalkonium chloride or bis-(2-hydroxy-5-chlorophenyl) sulphide, together with one or both other agents and a physiologically acceptable solvent which may have a synergistic action with the agent or agents.

We have found that a veterinary composition according to the invention containing the synergistic mixture is effective in curing infections such as mastitis in the presence of milk, for example, in a lactating cow, even though at the concentrations used the individual components are on their own completely ineffective or only slightly effective in curing infection in the presence of milk.

In addition the compositions of the invention are applied topically and so that risk of their contaminating milk or animal flesh is substantially reduced. Further the low toxicity of these components ensures that they are not harmful to human beings or the animals being treated.

The compositions of the invention are highly effective in curing quickly infection such as mastitis occurring in cows udders. This is important so as to reduce to a minimum any loss of milk yield. The compositions, however, may also be effective in the treatment of infection occurring in other parts of a cow or other domestic or farm animals.

Caprylhydrocupreinotoxine HCl, benzalkonium chloride and bis-(2-hydroxy-5-chlorophenyl) sulphide have all bactericidal properties. Caprylhydrocupreinotoxine HCl and bis-(2-hydroxy-5-chlorophenyl) sulphide also have fungicidal properties and therefore compositions containing them have bactericidal and fungicidal properties. Further bis-(2-hydroxy-5-chlorophenyl) sulphide has acaricidal properties and so compositions containing it have bactericidal, fungicidal and acaricidal properties.

Suitable physiologically acceptable solvents must not cause skin irritation, or allergies and suitable solvents include, for example, propylene glycol, polyoxyethylene glycols, esters of lactic acid and lactamides. Also water can be used when bis-(2-hydroxy-5-chlorophenyl) sulphide is not present since this is not water-soluble. The preferred solvent is, however, 2,2-dimethyl-1,3-dioxolane-4-methanol which exerts a powerful synergistic action when combined with one or more of the above agents and in addition has a negligible irritant effect on skin.

The compositions of the invention can simply be mixtures as set out above. Animal owners, however, often prefer a product in the form of an ointment and suitable ointments can be prepared by the addition to the compositions of the invention of substances such as, for example, lanolin, chloesterol alcohols or their derivatives, or polyoxyalkylene glycols or their derivatives so as to give semi-solid preparations of suitable consistency.

For best results in any particular case it is often desirable to develop an environment hostile to the organisms concerned and therefore for the compositions of the invention to have a suitably adjusted pH. In practice the compositions should not be alkaline and we find that optimum killing effect is given when the pH is from 3.5 to 4.5, although higher acid pH values can be employed.

The pH can be adjusted by adding to the mixture a physiologically acceptable buffer or carboxylic acid, and an example, of such an acid which can be employed is lactic acid. Unless the concentration of lactic acid is kept below approximately 0.4% by weight of the mixture, however, clotting of milk can occur. Such clotting is most undesirable when the preparation is being used, for example, in the udder since it makes it difficult to milk the cow and at the same time causes the animal distress and, of course, decreases the value of the milk.

We have now discovered that clotting of milk can be avoided by incorporating in the veterinary compositions of the invention an acylated protein hydrolysate instead of a carboxylic acid, such as lactic acid.

The use of an acylated protein hydrolysate otherwise known as a lipacid to adjust the pH of those veterinary compositions is found substantially to eliminate clotting of the milk when used to treat cows udders. This is particularly surprising having regard to the high buffering effect of milk coupled with the insolubility of the acylated protein hydrolysates.

We have found that acylated protein hydrolysates do not cause clotting at a pH of 4.1 and a concentration of 10% w./v. or even higher, whereas lactic acid causes clotting at a pH of 4.1 and a concentration of about 0.4%.

At concentrations of acylated protein hydrolysates which yield a pH closer to neutral than 4.1, they show an advantage over normal acidifying agents in that they contribute to the overall bactericidal action of the product whereas many alternative acidifying agents have no such effect. Thus, for example, lactic acid, whether by itself or when employed in the above mixture, has no bactericidal and/or fungicidal and/or acaricidal properties of its own and therefore does not enhance the synergistic killing action of the mixture on bacteria. However, acylated protein hydrolysates as used in the veterinary compositions of the invention are sometimes effective bactericidally by themselves, and are even more effective when mixed with liquids such as, propylene glycol and 2,2-dimethyl-1,3-dioxolane-4-methanol which can be used as solvents in the compositions of the invention.

Furthermore acylated protein hydrolysates do not produce harmful decomposition products as a result of their killing action on bacteria and are therefore harmless to both animals and humans, and in addition they have an intense bio-dynamic effect on skin cells, thus improving the rate of tissue repair.

After adding a certain amount of an acylated protein hydrolysate to the compositions of the invention it was found that the pH of the mixture reached a fairly constant value of approximately 4.1. This value coincides with a pH which produces excellent killing effect on bacteria and in addition creates an environment hostile for bactericidal re-infection. Therefore, the quantity of the acylated protein hydrolysate added to the composition does not need to be critically controlled. Preferably at least 4% by weight is added and even more preferred is that enough of the acylated protein hydrolysate be added to reach a pH of 4.1, i.e. in the region of 5% by weight. Thereafter the pH remains substantially constant irrespective of how much more acylated protein hydrolysate be added. In practice quantities in excess of 10% by weight of the acylated protein hydrolysate may be employed in the composition of the invention to take advantage of the therapeutic and other properties of these acylated protein hydrolysates.

Typical acylated protein hydrolysates for use in the mixture according to the invention are the palmitoyl derivative of hydrolysed casein amine acids, the palmitoyl derivative of hydrolysed colagen amino acids, the palmitoyl derivative of hydrolysed keratin amino acids, the lauroyl derivative of hydrolysed collagen amino acids, the lauroyl derivative of hydrolysed keratin amino acids, the stearoyl derivative of hydrolysed collagen amino acids, the stearoyl derivative of hydrolysed keratin amino acids and the oleoyl derivative of hydrolysed collagen amino acids.

The preferred acylated protein hydrolysates, however, are the eight carbon chain derivatives of hydrolysed collagen and keratin amino acids.

Suitable acylated protein hydrolysates and their preparation are described in United Kingdom Pat. No. 1,153,408 to which reference is made.

We find that the veterinary compositions according to the present invention can be improved in effectiveness by using relatively large amounts of bis-(2-hydroxy-5-chlorophenyl) sulphide where the sole or main bactericidal agent used in the mixture is bis-(2-hydroxy-5-chlorophenyl) sulphide.

In the case of a cow's udder the preferred maximum amount of bis-(2-hydroxy-5-chlorophenyl) sulphide in the veterinary compound according to the invention is that quantity which is at least sufficient to saturate completely the water and butter fat included in that quantity of milk which is likely to come into contact with one dosage of the mixture. In effect this would mean that when one dosage of the mixture is applied the mixture would come into contact with that quantity of milk which is contained in the udder. In practice we find that a composition containing not more than 15% by weight of the ointment of bis-(2-hydroxy-5-chlorophenyl) sulphide is suitable.

A preferred composition according to the invention for treating mastitis includes bis-(2-hydroxl-5-chlorophenyl) sulphide, an acylated protein hydrolysate and 2,2-dimethyl-1,3-dioxolane-4-methanol.

As described above, the veterinary compositions of the present invention are very useful in the treatment of mastitis in cows. They have, however, a general bactericidal and possibly also fungicidal and/or acaridical action when used in the veterinary field and so have a wide field of utility. Thus, for example, they can be used in the treatment of various animal infections in domestic animals and pets, e.g. the treatment of demodectic mange in dogs, or they can be used in shampoos, washes or dips for the treatment of parasitic and non-parasitic dermatitis or the like.

The compositions of the invention are in particular found to be very effective in the treatment of demodectic mange in dogs. This disease is caused by small parasites which are active below the skin. It is, therefore, very difficult to treat dogs effectively and if the disease becomes bad there has previously been no solution other than to have the dog killed. Compositions of the invention, however are found to be very effective in curing disease in dogs.

Preferred veterinary compositions according to the invention for treating infected dogs preferably contain bis-(2-hydroxy-5-chlorophenyl) sulphide, a synergistic solvent, preferably 2,2 - dimethyl-1,3-dioxolane-4-methanol, an acylated protein hydrolysate because of its excellent skin penetration and healing action when the disease is cured. Such compositions are highly effective in mange treatment because the acylated protein hydrolysate readily penetrate through both epi-dermal and sub-dermal layers and in the presence of the solvent can penetrate keratin layers. They take with them the powerful synergistic mixture of acaricide, solvent and acylated protein hydrolysate which is then able to kill the parasite causing the mange. Thereafter, the acylated protein hydrolysate promotes excellent healing.

Also according to the invention there is provided a dog shampoo containing these active ingredients which acts as a useful preventative against mange.

Where the compositions of the invention are intended for instillation into animal body cavities, we prefer that they do not contain the benzalkonium chloride, since that compound is sometimes found to cause irritation. However, veterinary compositions for external use, such as for application to skin, may contain benzalkonium chloride.

The veterinary compositions of the invention can contain other physiologically acceptable diluents or additives to bring the compositions into a form suitable for topical administration or instillation into animal body cavities. The exact physical nature of the composition, e.g. solution, ointment and so on, can be chosen in dependence upon the disease to be treated. Also the compositions can contain in addition other bactericidal or fungicidal compounds.

PRESENTLY PREFERRED EMBODIMENTS OF THE INVENTION

The bactericidal activity of the veterinary compositions according to the present invention will now be illustrated by the following experiments.

Bacteriological tests were carried out using the following organisms:

| Test organism | National collection of type cultures, number: | Abbreviation |
| --- | --- | --- |
| Streptococcus agalactia | 8100 | Strep A. |
| Streptococcus dysgalactia | 4385 | Strep D. |
| Streptococcus uberis | 3858 | Strep U. |
| Penicillin resistant organisms: | | |
| Staphylococcus aureus | 10442 | Staph. (PR). |
| Escherichia coli | 10487 | E. coli (PR). |
| Brucella abortus | 10542 | B. abortus (PR). |

The times taken for benzalkonium chloride, caprylhydrocupreinotoxine HCl and bis-(2-hydroxy-5-chlorophenyl) sulphide to kill samples of the organism Strep A, i.e. their "effectiveness," in Express Dairy "longlife" milk at various pH's were measured and the results are given in the following Table 1.

TABLE 1

| Bactericidal compound | Percent (by weight in milk) | pH | Killing time |
| --- | --- | --- | --- |
| Benzalkonium chloride | 0.01 | 6.6 | No kill. |
|  | 0.01 | 4.5 | Do. |
|  | 0.10 | 4.5 | 19 hours. |
| Caprylhydrocupreinotoxine HCl | 0.01 | 6.6 | No kill. |
|  | 0.01 | 4.5 | Do. |
|  | 0.10 | 4.5 | 60 minutes. |
| Bis-(2-hydroxy-5-chlorophenyl)- sulphide | 0.01 | 6.6 | No kill. |
|  | 0.01 | 4.5 | Do. |
|  | 0.10 | 4.5 | Do. |

The results given in this Table show that the killing power of benzalkonium chloride alone, of caprylhydrocupreinotoxine hydrochloride alone, and bis-(2-hydroxy-5-chlorophenyl) sulphide alone are much reduced in effectiveness in the presence of milk. In fact, their effectiveness is reduced to such an extent that at the "normal" pH of 6.6 all three are ineffective. However, when the pH is slightly acidified to pH 4.5 "effectiveness" returns to the benzalkonium chloride and caprylhydrocupreinotoxine hydrochloride, but not to the bis-(2-hydroxy-5-chlorophenyl) sulphide.

These results also suggest that the bactericidal action is not merely a function of hydrogen ion concentration since the "effectiveness" returned more sharply (giving a quicker kill) with the caprylhydrocupreinotoxine hydrochloride, less so with the benzalkonium chloride, and not at all with the bis-(2-hydroxy-5-chlorophenyl) sulphide.

The experiment was then repeated to find the time taken to kill a sample of Strep A using a combination of 0.1% by weight of the milk of each of benzalkonium chloride and caprylhydrocupreinotoxine HCl in Express Dairy "longlife" milk at a pH of 4.5. Very surprisingly it was found that the kill time was reduced to only 20 minutes. Thus, although at pH 4.5 benzalkonium chloride kills in 19 hours and caprylhydrocupreinotoxine hydrochloride kills in 1 hour, the mixture kills in 20 minutes, in other words very much faster than could be predicted.

When the experiment was repeated yet again employing in addition to the benzalkonium chloride and the caprylhydrocupreinotoxine HCl, 0.1% by weight of the milk of bis-(2 - hydroxy-5-chlorophenyl) sulphide, the killing time, i.e. effectiveness was reduced even further to only 5 minutes. Thus, although the bis-(2-hydroxy-5-chlorophenyl) sulphide is by itself ineffective in milk at a pH of 4.5 (see Table 1), its addition to the composition very surprisingly reduces the kill time and so increases the effectiveness of the composition of the invention still further. In a similar manner, a mixture according to the invention and containing 0.1% by weight of the milk of each of benzalkonium chloride, of caprylhydrocupreinotoxine HCl, and bis-(2-hydroxy-5-chlorophenyl) sulphide at a pH of 4.5 was effective against other organisms as shown in the following Table 2.

TABLE 2

| Organism: | Killing time |
| --- | --- |
| Strep D | |
| Strep U | |
| Staph. (PR) | 20 minutes (maximum). |
| E. coli (PR) | |
| B. abortus (PR) | |

These results demonstrate that when even penicillin resistant organisms are susceptible to the veterinary compositions according to the invention.

We have also found that the solvent 2,2-dimethyl-1,3-dioxolane-4-methanol can exert a synergistic action, a striking example being its action against Brucella abortus.

Using the agar-cup diffusion method benzalkonium chloride (0.01%) in water gave a nil effect; in 0.5 m. lactic acid (pH 4.5) it also gave a nil effect.

When 2,2-dimethyl-1,3-dioxolane-4-methanol alone was tested it gave a figure of 10 mm. but when benzalkonium chloride in 2,2-dimethyl-1,3-dioxolane-4-methanol was used the zone of inhibition increased surpringly to 43 mm.

The active component or components used in the composition according to the invention can be used in synergistic solvents such as 2,2-dimethyl-1,3-dioxolane-4-methanol in concentration of 0.1% by weight or more to give compositions which can be used therapeutically. Ointment forms may be prepared in a similar manner, although they tend to be less effective than simple solutions and so higher concentrations of active ingredients may have to be used.

The addition of an acylated protein hydrolysate also seems to have a synergistic effect with the benzalkonium chloride bis-(2-hydroxy-5-chlorophenyl) sulphide and caprylhydrocupreinotoxine. This is illustrated by the following experiment.

1% sensitivity discs were used, each one containing 100 μg. of each of the above ingredient separately and combinations of them. A 30% solution of an acylated protein hydrolysate in acetone was prepared and 0.01 ml. added to some discs, so that they contained 3 mg. of the acylated protein hydrolysates. Plates were impregnated with the organism, listed in the following Table 3 and the various types of discs were applied. The results are listed in the following Table 3 in which "L" represents the acylated protein hydrolysate, "Benz" the benzalkonium chloride, "Cap" the caprylhydrocupreinotoxine and "Bis" the bis-(2-hydroxy-5-chlorophenyl) sulphide.

TABLE 3

| Discs containing— | S. aureus | S. aureus PR | E. coli | E. coli PR | Strep A | Strep D | Strep U | B. abortus |
|---|---|---|---|---|---|---|---|---|
| L | 14 | 13 | 13 | 12 | 13 | 15 | 13 | 30+ |
| Benz | 18 | 17 | 12 | 20 | 13 | 13 | 14 | 17 |
| Benz plus L | 16 | 16 | 12 | 12 | 13 | 15 | 13 | 30+ |
| Cap | 10 | 8 | — | — | 10 | 10 | 10 | — |
| Cap plus L | 14 | 14 | 13 | 12 | 13 | 15 | 13 | 30+ |
| Bis | 19 | 13 | — | — | — | — | — | 19 |
| Bis plus L | 24 | 17 | 13 | 12 | 13 | 15 | 13 | 30+ |
| Benz plus Cap | 17 | 17 | 11 | 18 | 12 | 13 | 14 | 14 |
| Benz plus Cap plus L | 17 | 16 | 12 | 12 | 13 | 15 | 15 | 30+ |
| Cap plus Bis | 18 | 12 | — | — | — | 9 | — | 18 |
| Cap plus Bis plus L | 28 | 15 | 13 | 13 | 13 | 15 | 13 | 30+ |
| Benz plus Bis | 12 | 11 | — | — | — | 10 | 13 | 11 |
| Benz plus Bis plus L | 28 | [28]19 | 13 | 12 | 13 | 15 | 13 | 30+ |
| Benz plus Cap plus Bis | 12 | 13 | — | 12 | 10 | 9 | 11 | 10 |
| Benz plus Cap plus Bis plus L | 29 | [26]16 | 12 | 12 | 14 | 15 | 13 | 30+ |

NOTE.—Brackets indicate spreading of surface effect.

Precipitation of serum around lip discs makes inhibition hard to see

As can be seen the compositions of the invention have excellent killing effectiveness on the organisms noted. In particular the effectiveness of discs containing an acylated protein hydrolysate against *B. abortus* will be noted. Therefore veterinary compositions according to the invention containing an acylated protein hydrolysate are highly effective against the brusellosis organism (*Brucella abortus*).

The invention will now be illustrated by the following Examples of veterinary compositions according to the invention which are suitable for topical administration to animals.

EXAMPLE 1

A simple veterinary solution according to the invention which was effective was prepared from:

| | Percent by weight |
|---|---|
| Caprylhydrocupreinotoxine HCl | 0.1 |
| Lactic acid B.P. (88% w./w.) | 0.5 |
| 2,2 - dimethyl - 1,3-dioxolane-4-methanol to 100% by weight. | |

EXAMPLE 2

Another simple solution according to the invention which was effective was prepared from:

| | Percent by weight |
|---|---|
| Benzalkonium chloride | 2 |
| Lactic acid B.P. (88% w./w.) | 0.5 |
| 2,2 - dimethyl - 1,3-dioxolane-4-methanol to 100% by weight. | |

EXAMPLE 3

A further simple solution according to the invention which was effective was prepared from:

| | Percent by weight |
|---|---|
| Benzalkonium chloride | 1 |
| Caprylhydrocupreinotoxine HCl | 0.1 |
| Lactic acid B.P. (88% w./w.) | 0.5 |
| 2,2 - dimethyl - 1,3-dioxolane-4-methanol to 100% by weight. | |

EXAMPLE 4

An ointment according to the invention was prepared from the following components:

| | G. |
|---|---|
| Polyoxyethyleneglycol 4,000 | 25 |
| Lanolin B.P. (or water-soluble lanolin) | 38 |
| Lactic acid B.P. (88% w./w.) | 0.7 |
| Caprylhydrocupreinotoxine HCl | 1 |
| Benzalkonium chloride | 1 |
| Bis-(2-hydroxy-5-chlorophenyl) sulphide | 1 |
| 2,2-dimethyl-1,3-dioxolane-4-methanol to 100 g. | |

The ointment was prepared by melting the polyoxyethylene-glycol and lanolin together in a steam pan, the melted mixture was well stirred and then cooled to 45° C. The caprylhydrocupreinotoxine HCl and benzalkonium chloride were mixed together, and warmed to 45° C. and added to the above mixture. The resulting mixture was well stirred and cooled to 40° C., the lactic acid added, and the mixture stirred well. The bis-(2-hydroxy-5-chlorophenyl) sulphide was dissolved in the 2,2-dimethyl-1,3-dioxolane-4-methanol and added to the above mixture and left for an hour after stirring well.

The resulting ointment could then be filled into acid resistant collapsible tubes, or alternatively plastic containers, and sealed ready to use when required. The ointment appeared semi-liquid, but set in the tubes after standing overnight.

EXAMPLE 5

In a similar manner to that described in Example 4, an ointment according to the invention was prepared from the following components:

| | G. |
|---|---|
| Polyoxyethyleneglycol 4000 | 25 |
| Lanolin B.P. (or water soluble lanolin) | 30 |
| Lactic acid B.P. (88% w./w.) | 0.5 |
| Caprylhydrocupreinotoxine HCl | 0.1 |
| Benzalkonium chloride | 1 |
| Bis-(2-hydroxy-5-chlorophenyl) sulphide | 1 |
| 2,2-dimethyl-1,3-dioxalane-4-methanol to 100 g. | |

EXAMPLE 6

Experiments with milk have shown that lactic acid in concentrations above 0.4% of the milk cause the latter to clot, whereas below 0.4% of lactic acid, clotting is not a feature. Thus in some circumstances it may be desirable to use only a preparation containing less than 0.4% lactic acid even if the resulting pH is not at the desired optimum, but is nevertheless effective. Such a preparation can be prepared from the following components:

| | G. |
|---|---|
| Polyoxyethylene glycol 4000 | 25 |
| Lanolin B.P. (or water soluble lanolin) | 30 |
| Lactic acid B.P. (88% w./w.) | 0.25 |
| Caprylhydrocupreinotoxine HCl | 0.1 |
| Benzalkonium chloride | 1 |
| Bis-(2-hydroxy-5-chlorophenyl) sulphide | 1 |
| 2,2-dimethyl-1,3-dioxolane-4-methanol to 100 g. | |

Instead of deliberately adopting a pH at which lactic acid will not clot milk one can use instead of lactic acid to give the desired pH an acylated protein hydrolysate as described in the following Examples 7 to 11.

EXAMPLE 7

This Example illustrates qualitatively the bactericidal effectiveness of the selected acylated protein hydrolysate and its effectiveness when mixed with particular solvents.

The tests were carried out using the well-known agar plate method as used for testing antibiotics.

A 4% w./v. suspension of the acylated protein hydrolysate (APH) was compared with 4% w./v. solutions in propylene glycol, and in 2,2-dimethyl-1,3-dioxolane-4-methanol. The following results were obtained.

| Test organism | 4% w./v. APH suspension in water | 4% w./v. APH propylene glycol | 4% w./v. APH in 2,2-dimethyl-1,2-dioxolane-4-methanol |
|---|---|---|---|
| Staph (PR) | + | – – | – – – |
| E. Coli | + | – | – – |
| E. Coli (PR) | + | – | – – |
| Strep A | + | – | – – – |
| Strep D | – | – – | – – – |
| Strep U | + | – – | – – – |
| E. abortus | + | – – | – – – |

+ Indicates no inhibition.
–, – –, – – – Indicate relative increasing size of inhibition zone.

EXAMPLE 8

Solutions according to the invention having bactericidal and possibly fungicidal and/or acaricidal properties were prepared according to each of the following groups for normal external application.

Group 1, Bactericidal

Solution A:                         Percent by weight
- Caprylhydrocupreinotoxine HCl _____ 0.1
- Acylated protein hydrolysate _____ 10
- 2-2-dimethyl-1,3-dioxolane-4-methanol to 100% by weight.

Solution B:
- Benzalkonium chloride _____ 10
- Acylated protein hydrolysate _____ 20
- 2-2-dimethyl-1,3-dioxolane-4-methanol to 100% weight.

Group 2, Bactericidal, Fungicidal and Acaricidal

Solution C:                         Percent by weight
- Bis-(2-hydroxy-5-chlorophenyl) sulphide _____ 10
- Acylated protein hydrolysate _____ 10
- 2-2-dimethyl-1,3-dioxolane-4-methanol to 100% by weight.

Solution D:
- Benzalkonium chloride _____ 1
- Bis-(2-hydroxy-5-chlorophenyl) sulphide _____ 10
- Acylated protein hydrolysate _____ 25
- 2-2-dimethyl-1,3-dioxolane-4-methanol to 100% by weight.

EXAMPLE 9

Ointments according to the invention having bactericidal and possibly fungicidal and/or acaricidal properties were prepared from each of the following groups of constituents for instillation and normal external application.

Ointment A

An ointment was prepared from the following components:

G.
- Polyoxyethyleneglycol 4,000 _____ 25
- Lanolin B.P. (or water-soluble lanolin) _____ 28
- Acylated protein hydrolysate _____ 10
- Caprylhydrocupreinotoxine HCl _____ 0.1
- Bis-(2-hydroxy-5-chlorophenyl) sulphide _____ 2.5
- 2,2-dimethyl-1,3-dioxolane-4-methanol to 100 g.

Ointment B

G.
- Polyoxyethylene glycol 4,000 _____ 25
- Lanolin B.P. (or water-soluble lanolin) _____ 15
- Acylated protein hydrolysate _____ 20
- Caprylhydrocupreinotoxine HCl _____ 0.1
- Bis-(2-hydroxy-5-chlorophenyl) sulphide _____ 5
- 2,2-dimethyl-1,3-dioxolane-4-methanol to 100 g.

Ointment C

G.
- Polyoxyethylene glycol 4,000 _____ 25
- Lanolin B.P. (or water-soluble lanolin) _____ 20
- Acylated protein hydrolysate _____ 4
- Caprylhydrocupreinotoxine HCl _____ 0.1
- Bis-(2-hydroxy-5-chlorophenyl) sulphide _____ 15
- 2,2-dimethyl-1,3-dioxolane-4-methanol to 100 g.

Ointment D

G.
- Polyoxyethylene glycol 4,000 _____ 35
- Lanolin B.P. (or water-soluble lanolin) _____ 20
- Acylated protein hydrolysate _____ 20
- Caprylhydrocupreinotoxine HCl _____ 0.1
- Benzalkonium chloride (50% solution) _____ 2
- Bis-(2-hydroxy-5-chlorophenyl) sulphide _____ 15
- 2,2-dimethyl-1,3-dioxolane-4-methanol to 100 g.

EXAMPLE 10

Sensitivity discs of 7 mm. diameter were prepared by pipetting onto sterile 3 mm. chromatography paper 0.01 ml. of a solution comprising:

G.
- Polyoxyethylene glycol 4,000 _____ 35
- Lanolin _____ 20
- Acylated protein hydrolysate _____ 20
- Benzalkonium chloride _____ 1
- 2,2-dimethyl-1,3-dioxolane-4-methanol to 100 g.

dissolved in acetone. These discs were then carefully dried in an oven.

Using these discs it was found that when acute and sub-acute infections taken from animals were applied to them, the infections were killed.

An ointment was prepared from the following mixture:

G.
- Polyoxyethylene glycol 4000 _____ 35
- Lanolin _____ 20
- Acylated protein hydrolysate _____ 20
- Benzalkonium chloride _____ 1
- 2,2-dimethyl-1,3-dioxolane-4-methanol to 100 g.

When a group of animals, which has received unsuccessful treatment using conventional preparations, were treated with this veterinary ointment according to the invention, 75% of the animals in the group were cured.

EXAMPLE 11

Sensitivity discs were prepared each containing:

- Benzalkonium chloride _____ γg__ 100
- Bis-(2-hydroxy-5-chlorophenyl) sulphide __ γg__ 100
- Caprylhydrocupreinotoxine hydrochloride __ γg__ 100
- Acylated protein hydrolysate _____ mg__ 2

When acute and sub-acute infections taken from animals were applied to these discs, the infections were killed.

EXAMPLE 12

A veterinary composition according to the invention which has been found to be highly effective in the treatment of demodectic mange in dogs consists of:

Percent by weight
- Bis-(2-hydroxy-5-chlorophenyl) sulphide _____ 10
- Eight octanoyl chain derivative of hydrolysed keratin amino acid _____ 4
- Diethylamine salicylate _____ 10
- Dioctyl sodium sulphosuccinate _____ 0.5
- 2,2 - dimethyl-1,3-dioxolane-4-methanol to 100% by weight.

This composition was used in the treatment of dogs with demodectic mange as explained below.

Subject: Dalmation bitch.

Case history: This bitch had shown evidence of pustular demodectic mange for over 12 months. The severity and extent of the lesions had varied considerably. The animal had a chronic enteritis which pulled her down in condition and had made treatment and control of the mange difficult.

Extent and location of infection: Large areas on back and rump, feet, elbows and hocks and down inside of thighs.

Results: Marked improvement 95% regression of skin lesions after 10 days treatment. No return of lesions 10 days later. As well as this trial, the composition was used on another dog showing lesions on the dersal surface of the feet and on the hocks, total regression of the lesions occurred following 7 days treatment and hair growth commenced.

In Examples 7 to 11 the acylated protein hydrolysate used was the octanoyl derivative of collogenic acid.

A latitude of modification, change and substitution is intended in the foregoing disclosure and in some instances some features of the invention will be employed without a corresponding use of other features. Accordingly it is appropriate that the appended claims be constructed broadly and in a manner consistent with the spirit and scope of the invention herein.

We claim:

1. A veterinary composition for topical application in treating animal infections, comprising a synergistic mixture consisting essentially of:
   (a) at least one antibactericidal agent chosen from the group consisting of caprylhydrocupreinotoxine HCl, benzalkonium chloride, and bis-(2-hydroxy-5-chlorophenyl) sulphide,
   (b) 2,2-dimethyl-1,3-dioxolane-4-methanol as a synergistic solvent for said antibactericidal agent; and
   (c) said dioxolane being present in an amount effective to be antibactericidally synergistic with the agent selected from the group defined in paragraph (a) and the antibactericidal agent being present in at least 0.1% by weight of the mixture.

2. A composition according to Claim 1 which additionally contains acylated amino acids derived from hydrolyzed protein, said composition having an acid pH of 3.5 to near neutral.

3. A composition according to Claim 2 which contains at least 5% by weight of said acylated amino acids.

4. A composition according to Claim 2 which contains at least 10% by weight of said acylated amino acids.

5. A composition according to Claim 1 which has a pH of from 3.5 to 4.5.

6. A composition according to Claim 5 which additionally contains a physiologically acceptable buffer or carboxylic acid to give said composition said pH.

7. A veterinary compositions according to Claim 1 additionally containing a semi-solid chosen from the group consisting of lanolin, a cholesterol alcohol, a derivative of a cholesterol alcohol, a polyoxyalkylene glycol or a derivative of a polyoxyalkylene glycol to provide a semi-solid ointment preparation.

8. A composition according to Claim 6 wherein said carboxylic acid is lactic acid.

9. A veterinary composition for topical application in treating animal infections, consisting essentially of:
   (a) bis(2-hydroxy-5-chlorophenyl) sulphide as an antibactericidal agent;
   (b) 2,2-dimethyl-1,3-dioxolane-4-methanol as a synergistic solvent for said sulphide;
   (c) acylated amino acids derived from hydrolyzed protein;
   (d) said dioxolane being present in an amount effective to be antibactericidally synergistic with said sulphide and the sulphide being at least 0.1% by weight of the mixture;
   (e) said composition having an acid pH of 3.5 to near neutral.

10. A veterinary composition according to Claim 9 in which said acylated amino acids are chosen from the group consisting of an eight carbon chain acyl derivative of hydrolyzed collagen amino acids and an eight carbon chain acyl derivative of hydrolyzed keratin amino acids.

11. A veterinary composition according to Claim 9 in admixture with a shampoo, wash or dip composition.

12. An ointment veterinary composition according to Claim 9 containing not more than 15% by weight bis-(2-hydroxy-5-chlorophenyl) sulphide of said ointment.

References Cited

UNITED STATES PATENTS 3,004,894   10/1961   Johnson _____ 424—27

OTHER REFERENCES

Merck Index, 7th edition (1960), p. 128.

SAM ROSEN, Primary Examiner

U.S. Cl. X.R.

424—278, 329, 337